United States Patent [19]

Smith

[11] 4,363,505
[45] Dec. 14, 1982

[54] PIPE COUPLING

[76] Inventor: Alvin J. Smith, 228 Cordova Dr., Santa Barbara, Calif. 93109

[21] Appl. No.: 255,685

[22] Filed: Apr. 20, 1981

[51] Int. Cl.³ .............................................. F16L 47/02
[52] U.S. Cl. .................................. 285/369; 285/404; 285/423; 285/DIG. 16; 411/258
[58] Field of Search ................ 285/404, DIG. 16, 90, 285/423; 411/369, 258; 403/362

[56] References Cited

U.S. PATENT DOCUMENTS

| 51,910 | 1/1866 | Barbaroux | 285/404 |
|---|---|---|---|
| 839,947 | 1/1907 | McCluskey | 285/404 X |
| 3,022,197 | 2/1962 | Jedlicka | 411/258 |
| 3,160,054 | 12/1964 | Cohen et al. | 411/369 X |
| 3,291,670 | 12/1966 | Usab | 285/DIG. 16 X |
| 3,701,548 | 10/1972 | McGuire | 285/DIG. 16 X |
| 3,711,347 | 1/1973 | Wagner et al. | 411/258 X |

FOREIGN PATENT DOCUMENTS

| 2336478 | 2/1974 | Fed. Rep. of Germany | 285/404 |
|---|---|---|---|
| 2362926 | 6/1974 | Fed. Rep. of Germany | 285/DIG. 16 |
| 1291666 | 3/1962 | France | 285/404 |
| 1545362 | 5/1979 | United Kingdom | 285/404 |

Primary Examiner—Thomas F. Callaghan
Attorney, Agent, or Firm—William W. Haefliger

[57] ABSTRACT

A coupling to connect plastic pipe ends comprises:
(a) a tubular coupling member consisting of plastic, and having a bore at its mid-portion, two counterbores respectively intersecting opposite ends of the member, and two annular step shoulders respectively between the counterbores and said bore,
(b) plastic pipe ends inserted into the counterbores to extend proximate the step shoulders, the pipe ends adhesively joined to the counterbores,
(c) threaded fasteners extending generally radially through the coupling member to intersect the counterbores, the fasteners having tapered threads and tips that penetrate radially into the pipe ends,
(d) the fasteners having heads and there being seal means sealing off between the fasteners and the coupling member and pressurized therebetween.

7 Claims, 2 Drawing Figures

PIPE COUPLING

BACKGROUND OF THE INVENTION

This invention relates generally to interconnection of plastic pipe ends used in water pressure lines; more specifically, it concerns the coupling together of such plastic pipe ends.

Experience with PVC or other plastic pipe used for water pressure lines indicates that problems exist as regards holding water under high pressure. For example, when pipes are cemented together using plastic pipe adhesive, a waiting period of at least 24 hours is required before hydraulic pressure can be re-applied. Further, it is found that when pipe corners or angles are to be formed, a so-called "kicker" block of concrete is required, and is typically poured around the corner in order to keep the connection from slipping. Also, pipe elbows, as for example 90° elbows, can blow off under pressure.

SUMMARY OF THE INVENTION

It is a major object of the invention to provide a coupling for interconnecting plastic pipe ends which will eliminate the referenced problems and difficulties. Basically, the coupling comprises:

(a) a tubular coupling member consisting of plastic, and having a bore at its mid-portion, two counterbores respectively intersecting opposite ends of the member, and two annular step shoulders respectively between the counterbores and said bore, (b) plastic pipe ends inserted into the counterbores to extend proximate the step shoulders, the pipe ends adhesively joined to the counterbores, (c) threaded fasteners extending generally radially through the coupling member to intersect the counterbores, the fasteners having tapered threads and tips that penetrate radially into the pipe ends, (d) the fasteners having heads and there being seal means sealing off between the fasteners and the coupling member and pressurized therebetween.

As will appear, the seal means typically comprise elastomeric washers compressed between the fastener heads and the coupling member; pairs of fasteners penetrate generally diametrically oppositely into each pipe end; adhesive lubricant is located between each fastener and the coupling member; and each fastener defines a tapered shank shoulder that compresses the plastic member to form a seat and a seal against fluid leakage to the exterior.

These and other objects and advantages of the invention, as well as the details of an illustrative embodiment, will be more fully understood from the following drawings and description in which:

DRAWING DESCRIPTION

DETAILED DESCRIPTION

Figure 1:
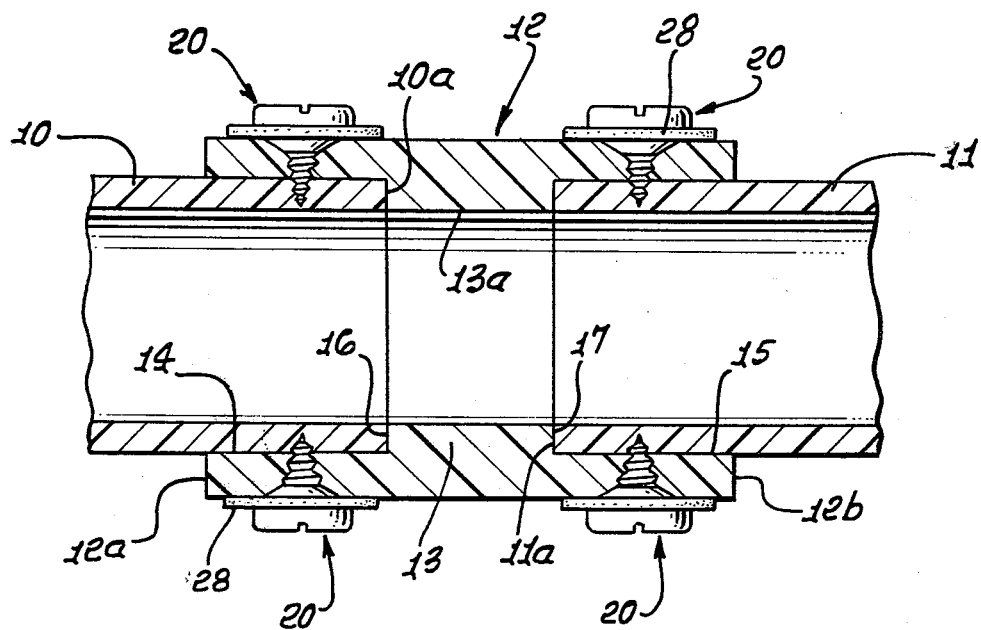
FIG. 1 is a side elevation taken in section.

In the drawings two plastic pipe ends are indicated at 10 and 11, the pipe typically consisting of polyvinylchloride, i.e. PVC. A tubular coupling member 12, also of the same plastic, has a bore 13a at its mid-portion 13, and two counterbores 14 and 15 respectively intersecting opposite ends 12a and 12b of the tubular coupling member. Pipe end 10 has a push fit with bore 14, and its end terminal 10a is inserted to extend adjacent annular step shoulder 16 of member 12. Likewise, pipe end 11 has a push fit with bore 15, and its end terminal 11a is inserted to extend adjacent annular step shoulder 17 of member 12. Typically, PVC cement or adhesive is applied to bores 14 and 15, and to the exterior surfaces of the pipe ends, prior to their insertion into the bores, so that upon curing of the cement, a tight coupling joint is formed. One usable cement is known as WELD-ON, a product of Industrial Polychemical Service, of Gardena, Calif.

In accordance with the invention, additional means is provided to retain the pipe ends in their positions as shown, both during curing of the cement so as to prevent displacement of the pipe ends relative to the member 12 during the cure, and also after such curing, i.e. during use as by fluid pressure application in the pipe coupler and pipe interior, and against the pipe end terminals 10a and 11a. In the embodiment shown, threaded fasteners are provided to extend generally radially through the coupling member walls, to intersect the counterbores 14 and 15 and to penetrate the pipe ends.

Figure 2:
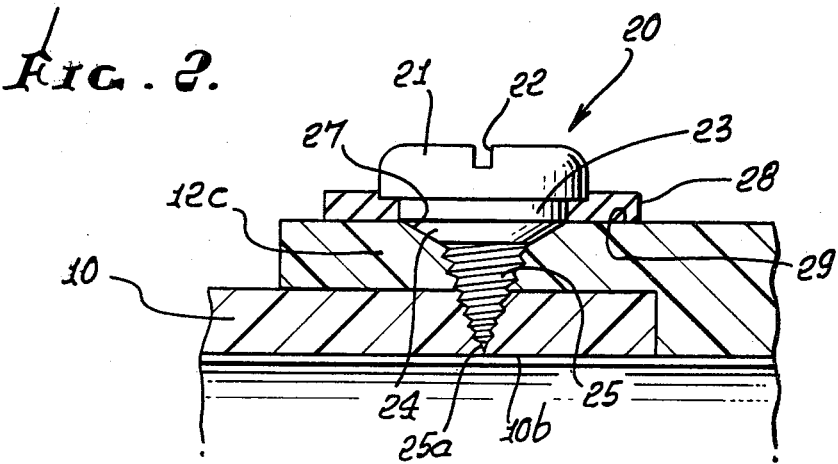
FIG. 2 is an enlarged fragmentary section, in elevation.

More specifically, four fasteners 20 are located in two pairs, one pair at diametrically opposite sides of pipe end 10, and the other at diametrically opposite sides of pipe end 11. Each fastener has, in sequence, a head 21, with a screw driver slot 22, a cylindrical shank portion 23, an axially tapered seat portion 24, and a tapered threaded portion 25. In assembled condition, the fastener forward tip 25a penetrates into the pipe end, the threaded portion 25 tightly grips both the coupler end portion (12c in FIG. 2) and the pipe end portion; the seat portion compressively deflects the coupler plastic inwardly to seat securely at annular shoulder 27, forming a seal therewith and also stabilizing the fastener against deflection in response to loads exerted on the pipe end; and the head 21 compressively deforms an elastomeric washer 28 whereby a second annular seal is formed between the head 21 and the coupler body outer surface 29. Accordingly, should the tip 25a inadvertantly penetrate through the pipe end bore 10b, fluid in the pipe cannot leak to the exterior adjacent the fastener. In addition, PVC adhesive cement, as described, may be applied to the fastener, or its receptive openings, to seal off between the fastener and the pipe end and coupler body, upon curing of the cement. Note that the fasteners rigidly hold and position the coupler and pipe ends in assembled relation, to facilitate undisturbed curing of the adhesive, and to strengthen the coupling, positively preventing endwise detachment of the pipe ends from the coupler body.

The washer 28 may consist of Neoprene, and the fasteners of stainless steel. Note that diameter 13a is about the same as the diameters of the pipe end bores. Seating of the tapered shoulder 24 on seat 27 and compression of the latter, as shown, limits the screw-in advancement of the fastener, which in turn limits compression of the washer 28, by the head 21, whereby tip 25a stops its advancement just prior to penetration of the bore 10b, in FIG. 2.

Typically, by torquing each fastener to about 35 inch-pounds of torque, the fastener is adequately seated.

When the coupling of the invention is used, water pressure may be turned on immediately after the coupling is made up, with the fasteners as described.

I claim:

1. In a coupling for interconnecting plastic pipe ends, (a) a tubular coupling member consisting of plastic, and having a bore at its mid-portion, two counterbores respectively intersecting opposite ends of the member, and two annular step shoulders respectively between the counterbores and said bore,
(b) plastic pipe ends inserted into the counterbores to extend proximate the step shoulders, the pipe ends adhesively joined to the counterbores,
(c) threaded fasteners extending generally radially through the coupling member to intersect the counterbores, the fasteners having tapered threads and tips that penetrate radially into the pipe ends,
(d) the fasteners having heads and there being seal means sealing off between the fasteners and the coupling member and pressurized therebetween,
(e) each fastener having an annular tapered shoulder spaced from the head and located between said head and said tapered thread, the shoulder interfitting a tapered shoulder on the coupling and closer to said thread than said seal means, to limit said pressurization and the penetration of the tips into the pipe ends, the tapered shoulder flaring widely toward the seal means, the seal means comprising elastomeric washers.

2. The coupling of claim 1 wherein the tips of two said fasteners penetrate generally diametrically oppositely into each pipe end, the tips remaining radially outwardly spaced from bores defined by the pipe ends.

3. The coupling of claim 1 including adhesive-lubricant located between the threads of each fastener and the tubular coupling member.

4. The coupling of claim 1 wherein said pipe end plastic consists of polyvinylchloride.

5. The coupling of claim 1 wherein the coupling bore has a diameter about the same as the bore diameters of the pipe ends.

6. The coupling of claim 2 wherein the fasteners consist of stainless steel.

7. The coupling of claim 1 wherein each pipe end is penetrated by two fastener tips, at approximately diametrically opposite sides of the coupling axis.

* * * * *